United States Patent
Park et al.

(10) Patent No.: US 8,462,873 B2
(45) Date of Patent: Jun. 11, 2013

(54) COMMUNICATION SYSTEM PERFORMING INTERFERENCE ALIGNMENT AND INTERFERENCE ALIGNMENT METHOD

(75) Inventors: Dohyung Park, Seoul (KR); Young-Doo Kim, Seoul (KR); Namyoon Lee, Daejeon-si (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 12/818,506

(22) Filed: Jun. 18, 2010

(65) Prior Publication Data

US 2011/0051837 A1 Mar. 3, 2011

(30) Foreign Application Priority Data

Sep. 1, 2009 (KR) .................. 10-2009-0082122

(51) Int. Cl.
*H04B 15/00* (2006.01)
(52) U.S. Cl.
USPC ........................................ 375/285; 375/296
(58) Field of Classification Search
USPC .................. 375/146, 152, 285, 296, 304, 316
See application file for complete search history.

(56) References Cited

U.S. PATENT DOCUMENTS

| 7,099,678 | B2 | 8/2006 | Vaidyanathan | |
|---|---|---|---|---|
| 7,469,021 | B2 | 12/2008 | Bolourchi et al. | |
| 2009/0257423 | A1* | 10/2009 | Kwon et al. | 370/345 |
| 2010/0009638 | A1* | 1/2010 | Saito | 455/73 |
| 2010/0027713 | A1* | 2/2010 | Huang et al. | 375/296 |
| 2010/0265813 | A1* | 10/2010 | Pereira et al. | 370/201 |

FOREIGN PATENT DOCUMENTS

| KR | 10-2005-0109789 | 11/2005 |
|---|---|---|
| KR | 10-2005-0065059 | 6/2006 |
| KR | 10-2008-0085382 | 9/2008 |
| KR | 10-2008-0086726 | 9/2008 |
| KR | 10-2008-0090735 | 10/2008 |

OTHER PUBLICATIONS

Cadambe et al ("Interference Alignment and Degrees of Freedom of the -User Interference Channel", IEEE Transactions on Information Theory, Aug. 2008, vol. 54, Issue 8, pp. 3425-3441).*
"Interference Alignment and Degrees of Freedom of the User Interference Channel", IEEE Transactions on Information Theory, Aug. 2008, vol. 54, Issue 8, pp. 3425-3441.*

* cited by examiner

*Primary Examiner* — Leon-Viet Nguyen
(74) *Attorney, Agent, or Firm* — NSIP Law (57) ABSTRACT

A communication device and a mobile station to perform interference alignment, and an interference alignment method are provided. Interference alignment may be performed to enable an interference signal, received in a mobile station, to be removed using channel information fed back from the mobile station.

16 Claims, 10 Drawing Sheets

[ DOWN LINK FRAME 0 ]

[ UP LINK FRAME 0 ]

FIG. 8

[ DOWN LINK FRAME 1 ]

FIG. 9

[ UP LINK FRAME 1 ]

FIG. 10

[ DOWN LINK FRAME 2 ]

COMMUNICATION SYSTEM PERFORMING INTERFERENCE ALIGNMENT AND INTERFERENCE ALIGNMENT METHOD

CROSS-REFERENCE TO RELATED APPLICATION(S)

This application claims the benefit under 35 U.S.C. §119(a) of Korean Patent Application No. 10-2009-0082122, filed Sep. 1, 2009, in the Korean Intellectual Property Office, the entire disclosure of which is incorporated herein by reference for all purposes.

BACKGROUND

1. Field

The following description relates to a technology to align interference in a communication system.

2. Description of the Related Art

With the development of communication technologies, research has been conducted regarding communication networks including a plurality of transmitting nodes in order to improve the data rate and reliability of communication. Here, the plurality of transmitting nodes may include various types of transmitters such as a cellular base station, a femto base station, a fixed base station, a mobile base station, and the like.

Each of the plurality of transmitting nodes may communicate with at least one corresponding receiving node using a same wireless resource such as a frequency, time, code resource, and the like. Here, a transmitting node and at least one receiving node may be referred to as a "transmitting/receiving pair."

In response to a plurality of transmitting nodes utilizing a same wireless resource, interference may occur in a receiving node of a transmitting and/or receiving pair due to transmitting nodes of other transmitting and/or receiving pairs. Accordingly, a transmission rate may be reduced due to interference. For example, where it is assumed that each of a base station 1, a base station 2, and a base station 3 corresponds to each of a receiving node 1, a receiving node 2, and a receiving node 3, respectively, interference may occur in the receiving node 2 due to the base station 1 and the base station 3.

Therefore, research has been conducted to develop an interference control or interference alignment technology that may increase the wireless resource use efficiency, and reduce a decrease in the transmission rate due to interference. However, an interference control or interference alignment technology may increase the overhead of a communication system.

SUMMARY

In one general aspect, there is provided a communication device of a plurality of communication devices performing interference alignment, the communication device including a receiving unit to receive a predetermined interference alignment structure order, and to receive precoding information generated based on the received interference alignment structure order, and a generation unit to generate a precoding vector based on the precoding information.

The interference alignment structure order may indicate an order where each of the plurality of communication devices sequentially generates the precoding vector to perform interference alignment.

The interference alignment structure order may indicate an order of repetition such that each of the plurality of communication devices transmits the reference signal, receives the precoding information, and generates the precoding vector.

The communication device may further include a transmission unit to transmit a reference signal to any one of a plurality of mobile stations (MSs) included in a user group corresponding to each of the plurality of communication devices, wherein the interference alignment structure order indicates an order of repetition where each of the plurality of communication devices transmits the reference signal, receives the precoding information, and generates the precoding vector.

The reference signal may indicate a signal transmitted through a single antenna, or a beamformed signal transmitted through a plurality of antennas.

The receiving unit may receive the precoding information from any one of a plurality of MSs included in a user group corresponding to each of the plurality of communication devices, and the precoding information may include at least one of channel information and a decoding vector generated in any one of the plurality of MSs.

The channel information may indicate channel information between an MS transmitting the precoding information and an MS receiving the precoding information, and the precoding information may indicate a vector obtained by multiplying the decoding vector with the channel information.

The generation unit may generate the precoding vector to enable the precoding vector to be orthogonal to the received precoding information, and the communication device may further include a transmission unit to transmit data which is beamformed using the generated precoding vector.

The precoding information may indicate a precoding index, the generation unit may generate the precoding vector using the precoding index and a previously stored codebook, and the codebook may include the precoding index and the precoding vector corresponding to the precoding index.

In another general aspect, there is provided an interference alignment method in any one of a plurality of communication devices performing interference alignment, the interference alignment method including receiving a predetermined interference alignment structure order, receiving precoding information generated based on the received interference alignment structure order, and generating a precoding vector based on the precoding information.

The interference alignment structure order may indicate an order such that each of the plurality of communication devices sequentially generates the precoding vector to perform interference alignment.

The receiving of the precoding information may receive the precoding information from any one of a plurality of MSs included in a user group corresponding to each of the plurality of communication devices, and the precoding information includes at least one of channel information and a decoding vector generated in any one of the plurality of MSs.

The precoding information may indicate a vector obtained by multiplying the decoding vector with the channel information.

In still another general aspect, there is provided an MS, including a receiving unit to receive a reference signal based on a predetermined interference alignment structure order, a generation unit to generate a decoding vector based on the received reference signal, and to generate precoding information based on the generated decoding vector, and a feedback unit to feed back the generated precoding information.

The interference alignment structure order may indicate an order where each of a plurality of communication devices sequentially generates the precoding vector to perform interference alignment.

The MS may further include a channel estimation unit to estimate channel information of each of the plurality of communication devices based on the received reference signal to perform channel estimation, wherein the receiving unit receives the reference signal to perform channel estimation from each of the plurality of communication devices.

The precoding information may include at least one of the channel information and the generated decoding vector.

In yet another general aspect, there is provided a communication method, including receiving a reference signal based on a predetermined interference alignment structure order, generating a decoding vector based on the received reference signal, generating precoding information based on the generated decoding vector, and feeding back the generated precoding information.

The interference alignment structure order may indicate an order such that each of a plurality of communication devices sequentially transmits the reference signal to perform interference alignment.

The communication method may further include estimating channel information of to each of the plurality of communication devices based on the received reference signal to perform channel estimation, wherein the receiving receives the reference signal to perform channel estimation from each of the plurality of communication devices.

The precoding information may include at least one of the channel information and the generated decoding vector.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
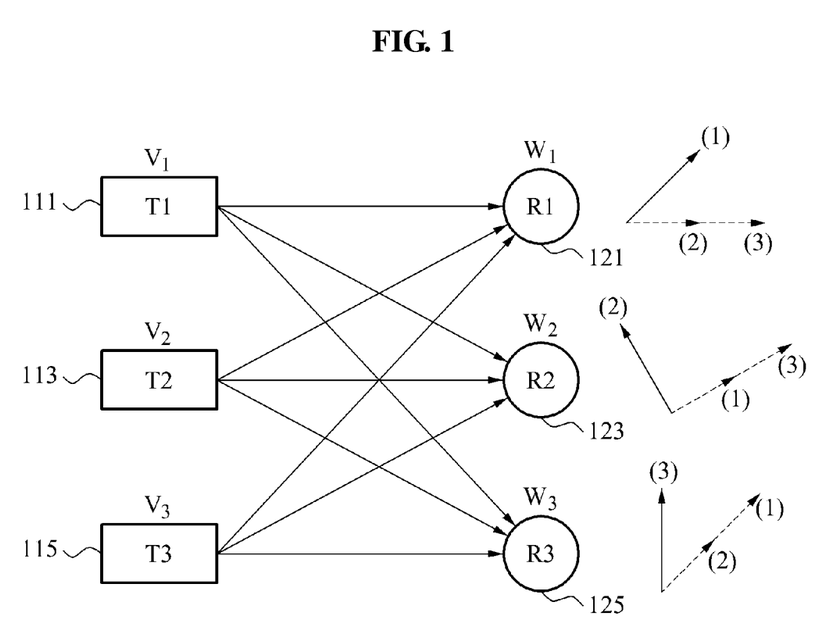
FIG. 1 is a diagram illustrating a communication system using an interference alignment scheme.

FIG. 1 illustrates a communication system using an interference alignment scheme, which is one of a plurality of interference control schemes.

Referring to FIG. 1, the communication system or a communication network may include a plurality of source nodes 111, 113, and 115. Each of the source nodes 111, 113, and 115 may correspond to each of a plurality of receiving nodes 121, 123, and 125, respectively.

Further, each of the source nodes 111, 113, and 115 may indicate a communication device to transmit data, for example, a fixed Base Station (BS), a mobile BS, a micro BS such as a femto BS, a relay station, and the like. Each of the receiving nodes 121, 123, and 125 may indicate a Mobile Station (MS) to receive data, for example, a relay station, a fixed MS, an MS, and the like.

For example, in response to each of the source nodes 111, 113, and 115 transmitting data using a same wireless resource, interference may occur in each of the source nodes 111, 113, and 115. That is, although a signal of the source node T(1) 111 may be a desired signal of the receiving node R(1) 121, signals of the source nodes T(2) 113 and T(3) 115 may cause to an interference to occur with regard to the receiving node R(1) 121. Similarly, an interference may occur in the receiving nodes R(2) 123 and R(3) 125, and the interference may reduce throughput of the entire communication system.

However, an interference control scheme or an interference alignment scheme may prevent throughput of the communication system from being reduced due to interference. That is, each of the source nodes T(1) 111, T(2) 113, and T(3) 115 may adjust a phase of a signal using each of a plurality of appropriately structured precoding matrices $v_1$, $v_2$, and $v_3$. The signal, having the adjusted phase, of each of the source nodes T(1) 111, T(2) 113, and T(3) 115 may be transmitted through channels. In this case, received signals of the receiving nodes R(1) 121, R(2) 123, and R(3) 125 may be divided into a desired signal and an interference.

For example, it may be assumed that each of arrows (1), (2), and (3) of FIG. 1 indicates a desired signal corresponding to each of the receiving nodes R(1) 121, R(2) 123, and R(3) 125, respectively. Referring to FIG. 1, received signals of the receiving node R(1) 121 may be divided into a desired signal (1) of the receiving node R(1) 121 and interferences (2) and (3). Also, received signals of the receiving node R(2) 123 may be divided into a desired signal (2) of the receiving node R(2) 123 and interferences (1) and (3). Further, received signals of the receiving node R(3) 125 may be divided into a desired signal (3) of the receiving node R(3) 125 and interferences (2) and (1).

Accordingly, each of the receiving nodes R(1) 121, R(2) 123, and R(3) 125 may remove the interferences using each of a plurality of appropriately structured decoding matrices $w_1$, $w_2$, and $w_3$, in order to extract the desired signal. That is, the source nodes T(1) 111, T(2) 113, and T(3) 115 may use each of the appropriately structured precoding matrices $v_1$, $v_2$, and $v_3$, and each of the receiving nodes R(1) 121, R(2) 123, and R(3) 125 may use each of the appropriately structured decoding matrices $w_1$, $w_2$, and $w_3$ Accordingly, a wireless resource use efficiency of the communication system may increase and throughput may be prevented from being reduced.

In FIG. 1, although the precoding matrices $v_1$, $v_2$, and $v_3$, and the decoding matrices $w_1$, $w_2$, and $w_3$ are referenced for convenience of description, other types of matrices or vectors may be used within the communication system. For example, the precoding matrices $v_1$, $v_2$, and $v_3$, and the decoding matrices $w_1$, $w_2$, and $w_3$ may include various other types of matrices or vectors depending on a number of data streams of each of the source nodes T(1) 111, T(2) 113, and T(3) 115.

In response to the communication system utilizing the interference control scheme or interference alignment scheme, significant overhead may be generated. As an example, the overhead may include overhead generated where MSs feed back information about interference channels, overhead generated where the information about interference channels is shared, and overhead generated where precoding matrices or decoding matrices are repeatedly generated.

For example, in a Time Division Duplex (TDD) environment, each of the source nodes T(1) 111, T(2) 113, and T(3) 115 and each of the receiving nodes R(1) 121, R(2) 123, and R(3) 125 may generate the precoding matrices $v_1$, $v_2$, and $v_3$, and the decoding matrices $w_1$, $w_2$, and $w_3$ using an iterative method. The use of an iterative method may also potentially increase an overhead generated in a communication system.

Where a number of pairs of source nodes and receiving nodes is assigned a value of K, and the interference alignment scheme is optimally utilized, communication delay and overhead may increase since a reference signal may be repeatedly transmitted and/or received between the source nodes and the receiving nodes. In FIG. 1, K may be "3." That is, when K is "3," a reference signal may be transmitted and/or received between the source nodes and the receiving nodes approximately fifty times. A technology that may reduce a number of repetitions between source nodes and receiving nodes and reduce overhead in a communication system may be desired.

Figure 2:
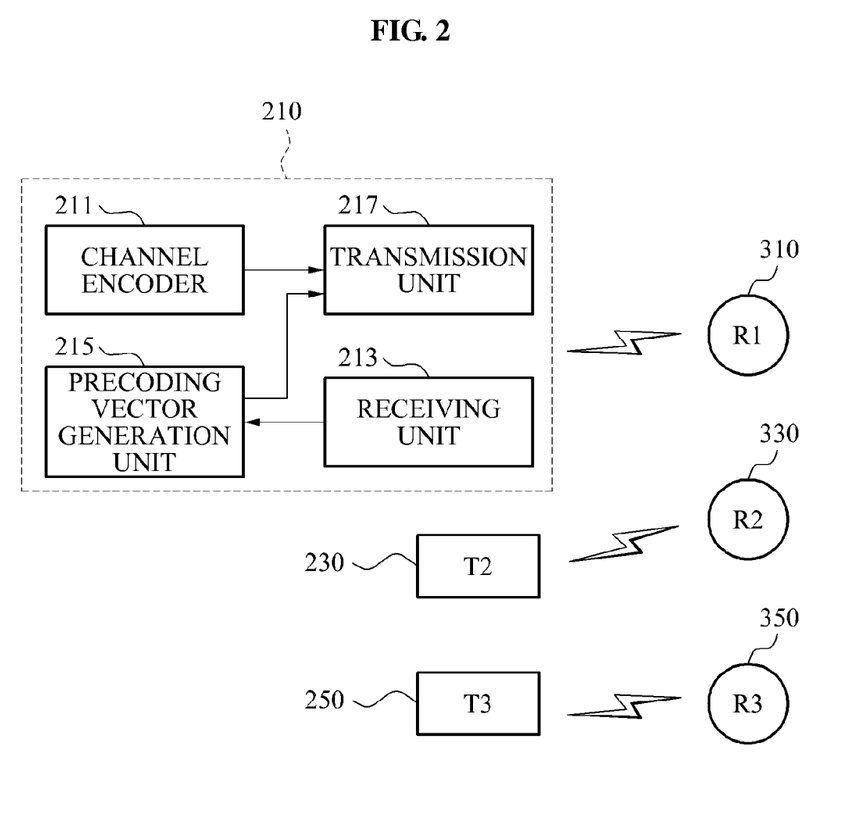
FIG. 2 is a diagram illustrating an example of a configuration of a source node.

FIG. 2 is a diagram illustrating an example of a configuration of a source node. For convenience of description, it may be assumed that a number of pairs of source nodes and receiving nodes, that is, K is "3," a number of antennas of each of the source nodes is "3," and a number of antennas of each of the receiving nodes is "2."

Figure 3:
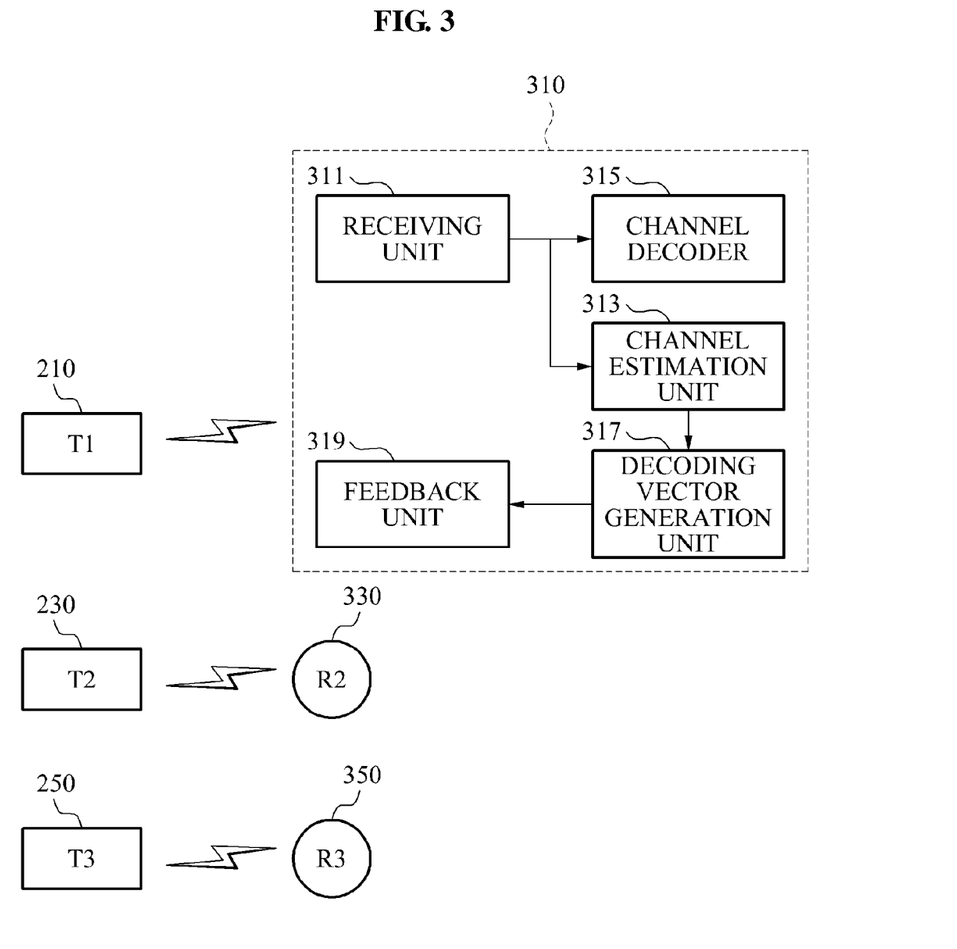
FIG. 3 is a diagram illustrating an example of a configuration of a mobile station (MS).

In FIG. 1 through FIG. 3, it may be assumed that an example of a communication system may include three source nodes 210, 230, and 250, and three receiving nodes 310, 330, and 350. Here, each of the receiving nodes 310, 330, and 350 may correspond to each of the source nodes 210, 230, and 250, respectively, and each of the receiving nodes 310, 330, and 350 may be any one of a plurality of receiving nodes included in a user group corresponding to each of the source nodes 210, 230, and 250, respectively.

Referring to FIG. 2, the source node 210 includes a channel encoder 211, a receiving unit 213, a precoding vector generation unit 215, and a transmission unit 217.

The channel encoder 211 may perform, in the source node 210 by applying a channel coding algorithm, channel coding and modulation with respect to data to be transmitted. The source node 210 may be a communication device, and the channel coding algorithm may indicate an algorithm where a convolution code, a block code, or a convolution and block code are combined, which will not be further described in detail since the coding algorithm is well known to one of ordinary skill in the art.

The receiving unit 213 may receive a predetermined interference alignment structure order. Also, the receiving unit 213 may receive precoding information from at least one of the receiving nodes 310, 330, and 350.

The interference alignment structure order may indicate an order where each of the plurality of source nodes 210, 230, and 250 sequentially generates a precoding vector to perform interference alignment. The receiving unit 210 may receive the interference alignment structure order from a central control unit which is not illustrated in FIG. 2. For example, the central control unit controlling the communication system may be a Radio Network Controller (RNC), and the RNC may be located outside or inside of a source node.

Also, the precoding information may include a decoding vector and channel information, which is further described with reference to FIG. 3.

The precoding vector generation unit 215 may generate a precoding vector $v_1$ based on the precoding information. For example, the precoding vector generation unit 215 may generate the precoding vector according to Equation 1 shown below. That is, the precoding vector generation unit 215 may generate the precoding vector to enable the precoding vector to be orthogonal to the received precoding information.

$$w_j H[ji] v_i = 0, v_i = (H[ji] w_j)^T \qquad \text{[Equation 1]}$$

In the above Equation 1, i and j may denote a source node and a receiving node, respectively. Also, $w_j$ may denote a decoding vector of the receiving node j, and $v_i$ may denote a precoding vector of the source node i. H[ji] may denote channel information.

That is, $w_j H[ji]$ may denote precoding information, and the precoding information may be obtained by multiplying the decoding vector with the channel information. Here, the channel information H[ji] may be channel information between a receiving node transmitting the precoding information and a transmission node receiving the precoding information, and may be obtained through channel estimation in the receiving node transmitting the precoding information.

Also, where an order of the source node 210 is "1," the precoding vector generation unit 215 may randomly generate an arbitrary precoding vector $v_1$ by referring to the interference alignment structure order.

The transmission unit 217 may perform beamforming with respect to a reference signal using the precoding vector, randomly generated in the precoding vector generation unit 215, or using Equation 1 and transmit the reference signal to the receiving nodes 310, 330, and 350, respectively.

Also, the transmission unit 210 may transmit the reference signal to the receiving nodes 310, 330, and 350 to enable the receiving nodes 310, 330, and 350 to perform channel estimation. Here, the reference signal may be a signal transmitted through a single antenna, or a beamformed signal transmitted through a plurality of antennas. For example, the reference signal may be a pilot signal.

FIG. 3 illustrates an example of a configuration of an MS.

Referring to FIG. 3, the receiving node 310 includes a receiving unit 311, a channel estimation unit 313, a channel decoder 315, a decoding vector generation unit 317, and a feedback unit 319.

The receiving unit 311 may receive reference signals from the source nodes 210, 230, and 250 based on a predetermined interference alignment structure order. The interference alignment structure order may indicate an order where each of the source nodes 210, 230, and 250 sequentially transmits the reference signals to perform interference alignment.

Also, the reference signal may be a signal transmitted through a single antenna, or a beamformed signal transmitted through a plurality of antennas. For example, the reference signal may be a pilot signal.

The channel estimation unit 313 may estimate a channel between the receiving node 310 and each of the sources nodes 210, 230, and 250 using the reference signals received from the sources nodes 210, 230, and 250.

That is, the channel estimation unit 313 may obtain channel information H[11] between the receiving node 310 and the source node 210, channel information H[12] between the receiving node 310 and the source node 230, and channel information H[13] between the receiving node 310 and the source node 250. For example, a Maximum Likelihood Channel Estimation algorithm may be used to perform channel estimation, and a channel estimation algorithm is not described in detail since it is well known to one of ordinary skill in the art.

The channel decoder 315 may perform beamforming and decoding with respect to the received reference signal, and perform channel decoding with respect to data transmitted from the source node 210 corresponding to the receiving node 310. Here, an algorithm to perform channel decoding may correspond to a channel coding algorithm which is used in the source node 210. For example, the channel decoding algorithm may include a channel coding algorithm where a convolution code, a block code, or a convolution and block code are combined.

The decoding vector generation unit 317 may generate a decoding vector using the channel information, estimated by the channel estimation unit 313, and the reference signal decoded by the channel decoder 315. Also, the decoding vector generation unit 317 may generate precoding information based on the generated decoding vector.

For example, the decoding vector generation unit 317 may generate the decoding vector according to Equation 2 shown below. That is, the decoding vector generation unit 317 may generate the decoding vector to enable the decoding vector to be orthogonal to the decoded reference signal. Also, the decoding vector generation unit 317 may generate the precoding information by multiplying the generated decoding vector $w_1$ with the channel information H[ji] estimated by the channel estimation unit 313.

$$w_j H[ji] v_i = 0, w_j = (v_i H[ji])^T \qquad \text{[Equation 2]}$$

In the above Equation 2, i and j may denote a source node and a receiving node, respectively. Also, $w_j$ may denote a decoding vector of the receiving node j, and $v_1$ may denote a precoding vector of the source node i. H[ji] and $w_j$H[ji] may denote channel information and precoding information, respectively. In this instance, the channel information H[ji] may indicate channel information between the receiving node j to transmit the precoding information and the source node i to receive the precoding information.

The feedback unit 319 may feed back the generated precoding information to any one of the source nodes 210, 230, and 250 based on the predetermined interference alignment structure order, which is further described with reference to FIGS. 4 and 5.

Figure 4:
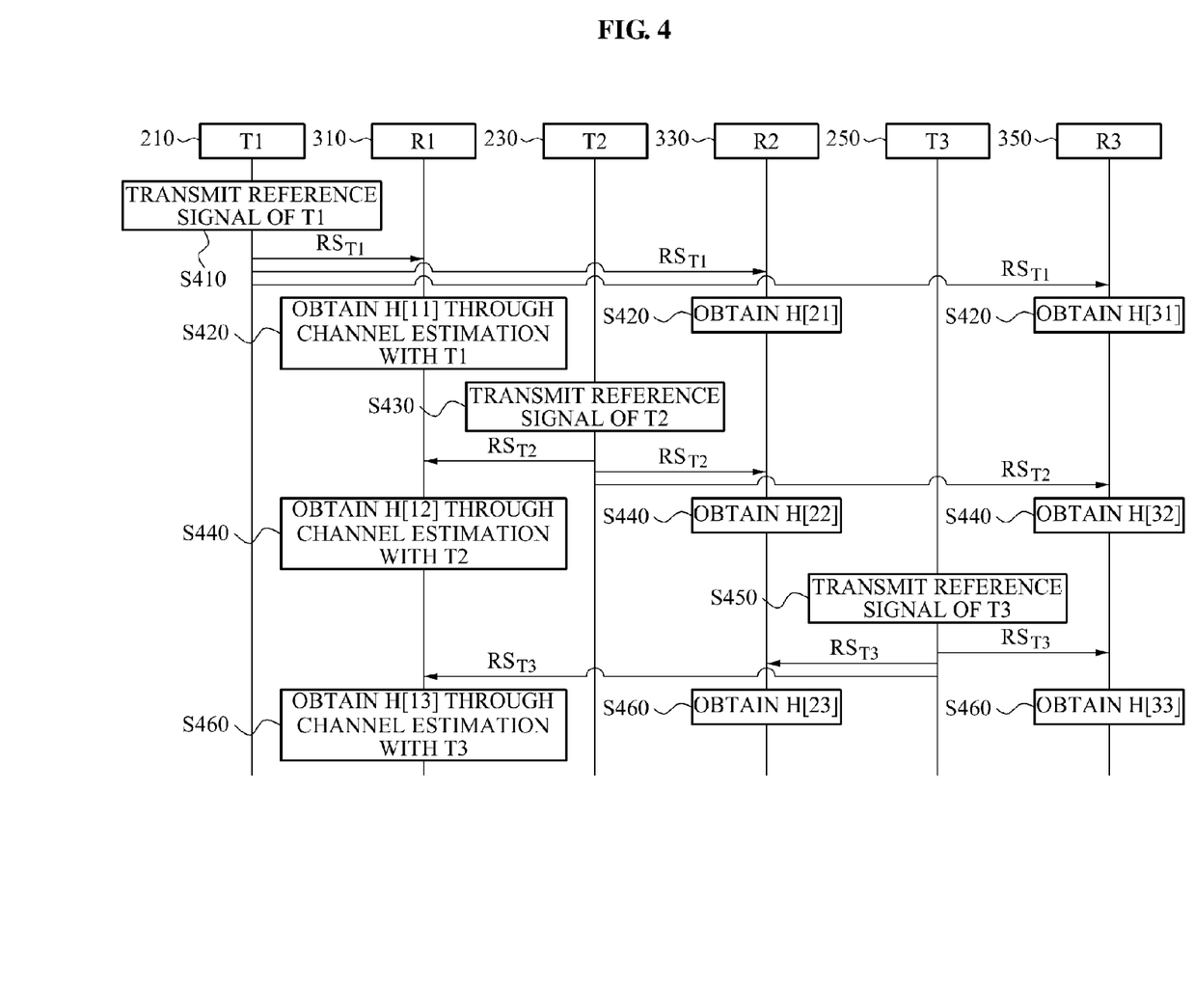
FIG. 4 is a flowchart illustrating an example of a channel estimation method in a communication system.

FIG. 4 illustrates an example of a channel estimation method in a communication system. FIG. 5 illustrates an example of an interference alignment method in a communication system.

For convenience of description and as an illustration, it may be assumed that a number of pairs of the source nodes 210, 230, and 250 and receiving nodes 310, 330, and 350, that is, K is "3," a number of antennas of each of the source nodes 210, 230, and 250 is "3," a number of antennas of each of the receiving nodes 310, 330, and 350 is "2," and an interference alignment structure order is predetermined to be in an order from the source node T(1) 210, the source node T(2) 230, and the source node T(3) 250.

At operation S410, the source node T(1) 210 may transmit a reference signal $RS_{T1}$ to the receiving nodes 310, 330, and 350. The reference signal $RS_{T1}$ may be a signal transmitted through a single antenna, or a beamformed signal transmitted through a plurality of antennas.

At operation S420, each of the receiving nodes 310, 330, and 350 may receive the reference signal $RS_{T1}$, estimate a channel between the source node T(1) 210 and each of the receiving nodes 310, 330, and 350 based on the reference signal $RS_{T1}$, and thereby may obtain channel information. That is, each of the receiving nodes 310, 330, and 350 may obtain channel information H[11], channel information H[21], and channel information H[31] using the reference signal $RS_{T1}$ and a channel estimation algorithm.

At operation S430, the source node T(2) 230 may transmit a reference signal $RS_{T2}$ to the receiving nodes 310, 330, and 350.

At operation S440, each of the receiving nodes 310, 330, and 350 may receive the reference signal $RS_{T2}$, estimate a channel between the source node T(2) 230 and each of the receiving nodes 310, 330, and 350 based on the reference signal $RS_{T2}$, and thereby may obtain channel information. That is, each of the receiving nodes 310, 330, and 350 may obtain channel information H[12], channel information H[22], and channel information H[32] using the reference signal $RS_{T2}$ and the channel estimation algorithm.

At operation S450, the source node T(3) 250 may transmit a reference signal $RS_{T3}$ to the receiving nodes 310, 330, and 350.

At operation S460, each of the receiving nodes 310, 330, and 350 may receive the reference signal $RS_{T3}$, estimate a channel between the source node T(3) 250 and each of the receiving nodes 310, 330, and 350 based on the reference signal $RS_{T3}$, and thereby may obtain channel information. That is, each of the receiving nodes 310, 330, and 350 may obtain channel information H[13], channel information H[23], and channel information H[33] using the reference signal $RS_{T3}$ and the channel estimation algorithm.

In FIG. 4, although it is described that the source node T(1) 210 transmits the reference signal $RS_{T1}$, the source node T(2) 230 transmits the reference signal $RS_{T2}$, and then the source node T(3) 250 transmits the reference signal $RS_{T3}$, the channel estimation method is not limited to the above described example. That is, an order that each of the source nodes 210, 230, and 250 transmits a reference signal may vary, and the source nodes 210, 230, and 250 may, for example, simultaneously transmit the reference signal to the receiving nodes 310, 330, and 350.

Figure 5:
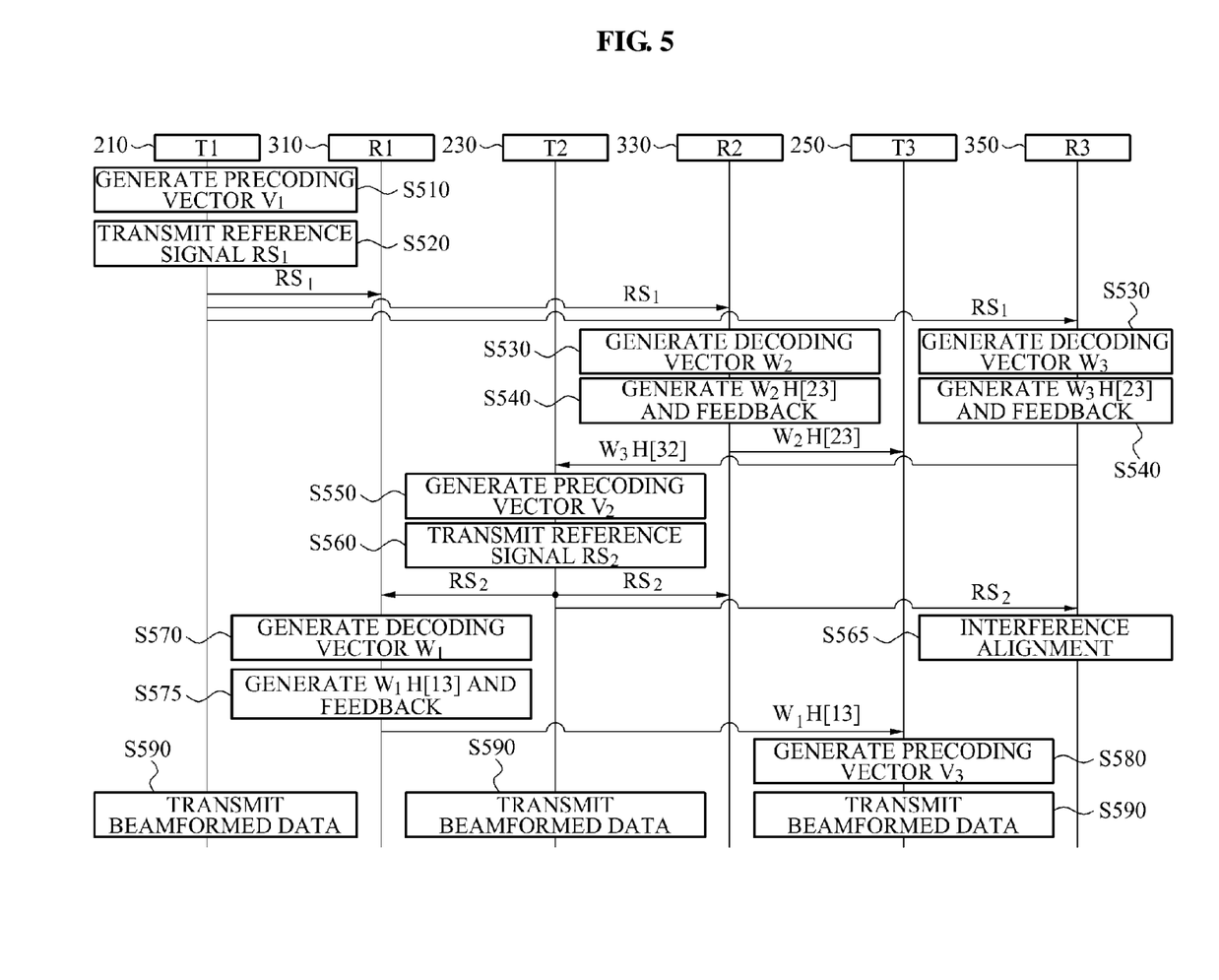
FIG. 5 is a flowchart illustrating an example of an interference alignment method in a communication system.

FIG. 5 illustrates an example of an interference alignment method in a communication system. Here, as an illustration, it may be assumed that a number of pairs of the source nodes 210, 230, and 250 and receiving nodes 310, 330, and 350, that is, K is "3," a number of antennas of each of the source nodes 210, 230, and 250 is "3," a number of antennas of each of the receiving nodes 310, 330, and 350 is "2," and an interference alignment structure order is predetermined to be in an order from the source node T(1) 210, the source node T(2) 230, and the source node T(3) 250.

At operation S510, the source node T(1) 210 may randomly generate a precoding vector $v_1$. Here, the source node T(1) 210 may be set as a node to first perform interference alignment based on the interference alignment structure order.

At operation S520, the source node T(1) 210 may transmit a reference signal $RS_1$, which is beamformed using the generated precoding vector $v_1$, to the receiving nodes 310, 330, and 350, respectively.

Figure 6:
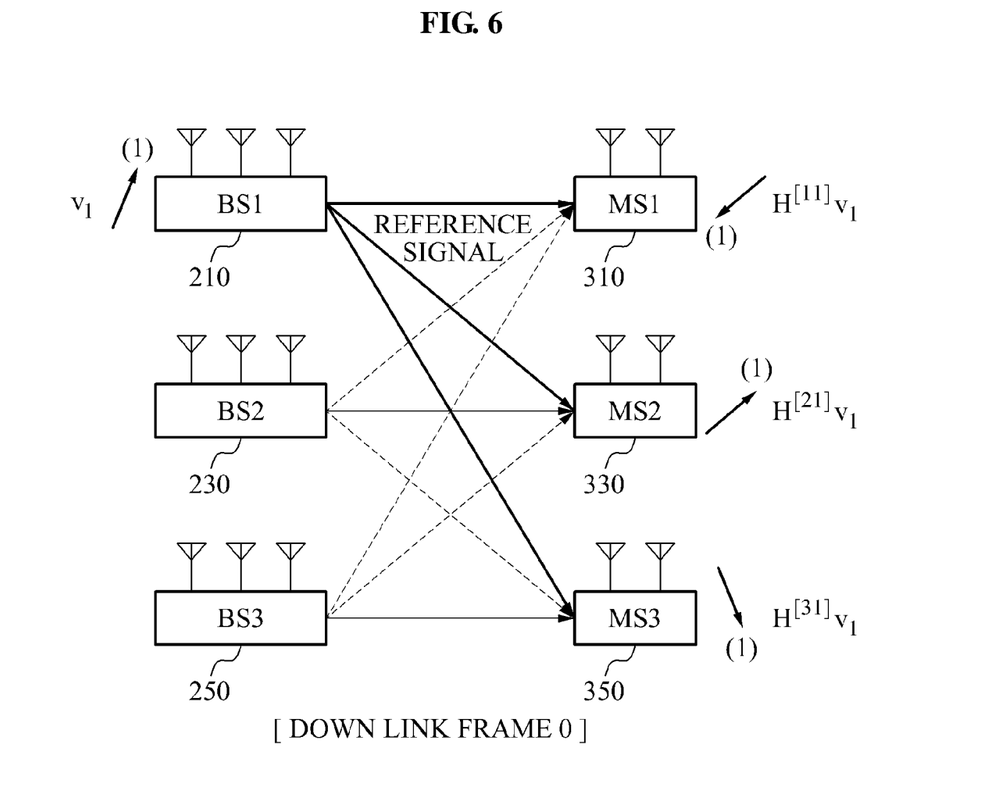
FIGS. 6 through 10 are diagrams illustrating examples of an interference alignment method in a communication system.

That is, as illustrated in FIG. 6, when the source node T(1) 210 transmits the reference signal $RS_1$, which is beamformed using the precoding vector $v_1$, to the receiving nodes 310, 330, and 350, each of the receiving nodes 310, 330, and 350 may receive a beamformed reference signal in a direction of $H[11]v_1$, a reference signal in a direction of $H[21]v_1$, and a reference signal in a direction of $H[31]v_1$.

At operation S530, the source node T(2) 230 may receive the reference signal $RS_1$, transmitted from the source node T(1) 210, and generate a decoding vector $w_2$.

For example, the receiving node R(2) 330 may receive the beamformed reference signal $RS_1$ in the direction of $H[21]v_1$, from the source node T(1) 210, and generate the decoding vector $w_2$ to enable the decoding vector $w_2$ to be orthogonal to the reference signal $RS_1$ according to the above Equation 2.

In this example, the receiving node R(3) 350 may generate a decoding vector $w_3$ in a same manner as the receiving node R(2) 330.

At operation S540, the receiving node R(2) 330 may generate precoding information based on the generated decoding vector $w_2$, and feed back the precoding information. In this case, the receiving node R(2) 330 may feed back the generated precoding information to source nodes excluding the source node T(1) 210 and the source node T(2) 230. Here, the source node T(1) 210 may transmit the reference signal $RS_1$ which is used to generate the decoding vector $w_2$, and the source node T(2) 230 may correspond to the receiving node R(2) 330.

Furthermore, the receiving node R(2) 330 may generate precoding information $w_2H[23]$ by multiplying the generated decoding vector $w_2$ with the channel information $H[23]$ obtained at operation S460 in FIG. 4. Also, the receiving node R(2) 330 may feed back the generated precoding information $w_2H[23]$ to the source node T(3) 250. For example, where K is "4," the receiving node R(2) 330 may feed back the generated precoding information $w_2H[23]$ to the source node T(3) 250, and feed back precoding information $w_2H[24]$ to a source node T(4) which is not illustrated in FIG. 4.

Figure 7:
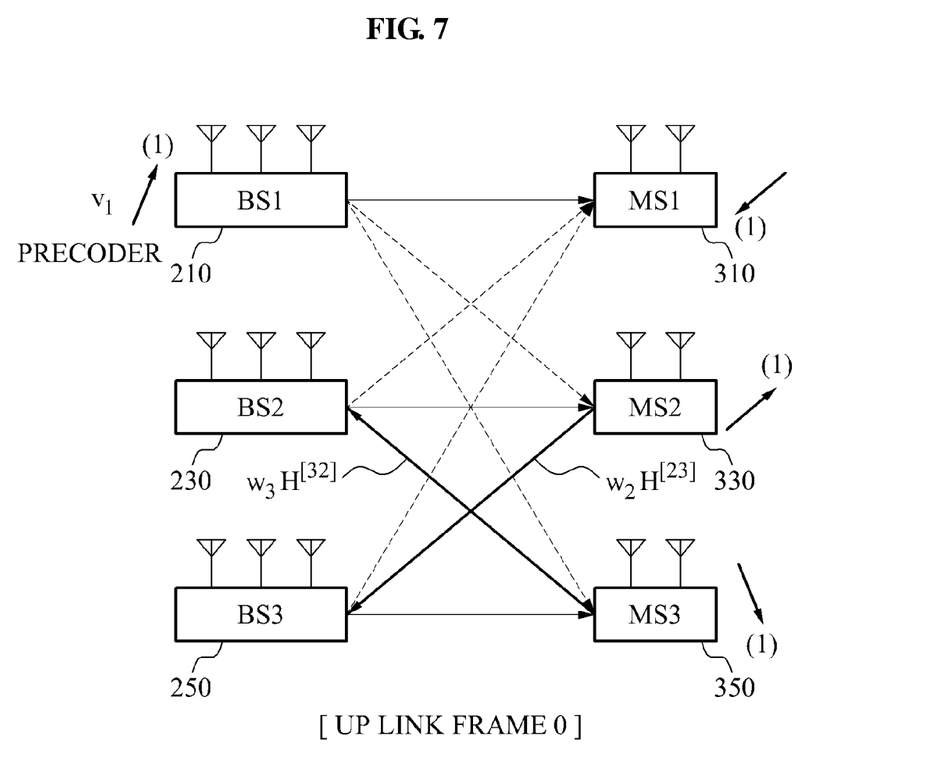

Also, the receiving node R(3) 350 may generate precoding information $w_3H[32]$ in a same manner as the receiving node R(2) 330, and feed back the generated precoding information $w_3H[32]$ to the source node T(2) 230, as illustrated in FIG. 7.

At operation S550, the source node T(2) 230 may generate a precoding vector $v_2$ based on the received precoding information $w_3H[32]$. That is, the source node T(2) 230 may generate the precoding vector $v_2$ to enable the precoding vector $v_2$ to be orthogonal to the received precoding information $w_3H[32]$ according to Equation 1. Accordingly, since the source node T(2) 230 may generate a precoding vector without information about entire channel matrices, overhead due to feedback may be reduced.

At operation S560, the source node T(2) 230 may transmit a reference signal $RS_2$, which is beamformed using the generated precoding vector $v_2$, to the receiving nodes 310, 330, and 350.

Figure 8:
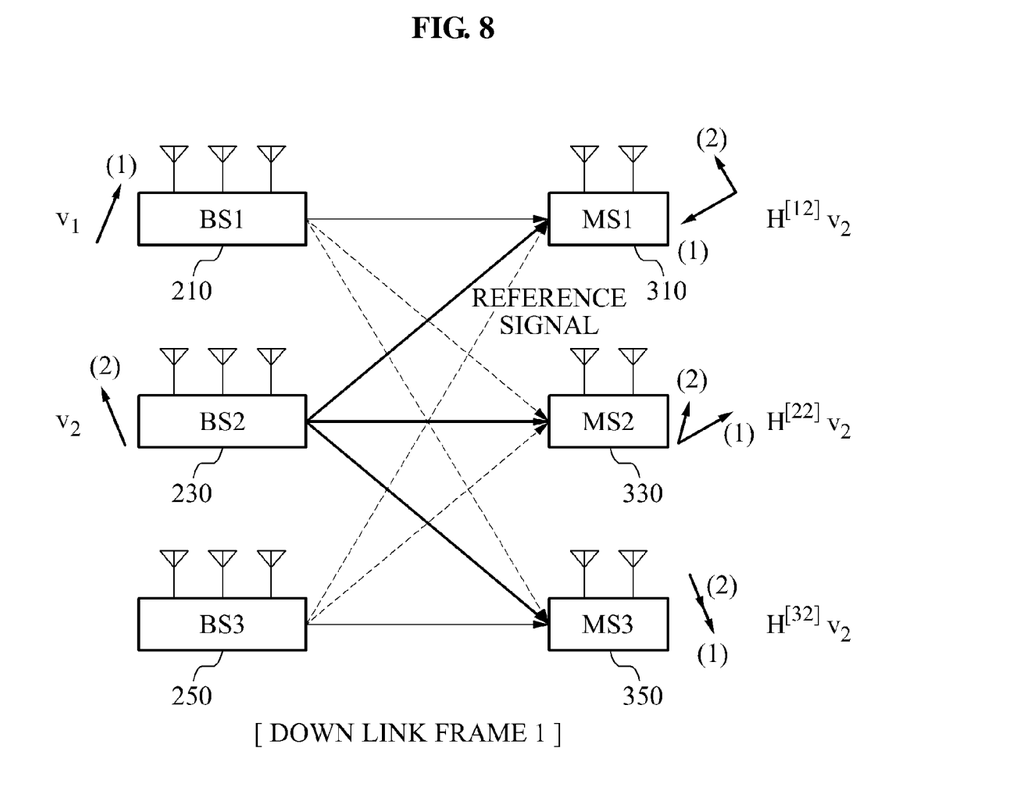

That is, as illustrated in FIG. 8, where the source node T(2) 230 transmits the reference signal $RS_2$, which is beamformed using the precoding vector $v_2$, to the receiving nodes 310, 330, and 350, each of the receiving nodes 310, 330, and 350 may receive a beamformed reference signal in a direction of $H[12]v_2$, a reference signal in a direction of $H[22]v_2$, and a reference signal in a direction of $H[32]v_2$.

At operation S565, the receiving node R(3) 350 may receive the reference signal in the direction of $H[32]v_2$, and thus an interference alignment with the reference signal in the direction of $H[31]v_1$ may be performed. The reference signal in the direction of $H[31]v_1$ may be received at operation S530. That is, as illustrated in FIG. 8, the reference signal in the direction of $H[32]v_2$ and the reference signal in the direction of $H[31]v_1$, received in the receiving node R(3) 350, may be an interference signal. The interference signal may be simultaneously removed by the decoding vector $w_3$ generated at operation S530.

At operation S570, the receiving node R(1) 310 may receive the reference signal $RS_2$, transmitted from the source node T(2) 230, and generate a decoding vector $w_1$.

That is, the receiving node R(1) 310 may receive the reference signal $RS_2$ in the direction of $H[12]v_2$ in the same manner as received at operation S530, and generate the decoding vector $w_1$ to enable the decoding vector $w_1$ to be orthogonal to the received reference signal $RS_2$ according to the above Equation 2.

Figure 9:
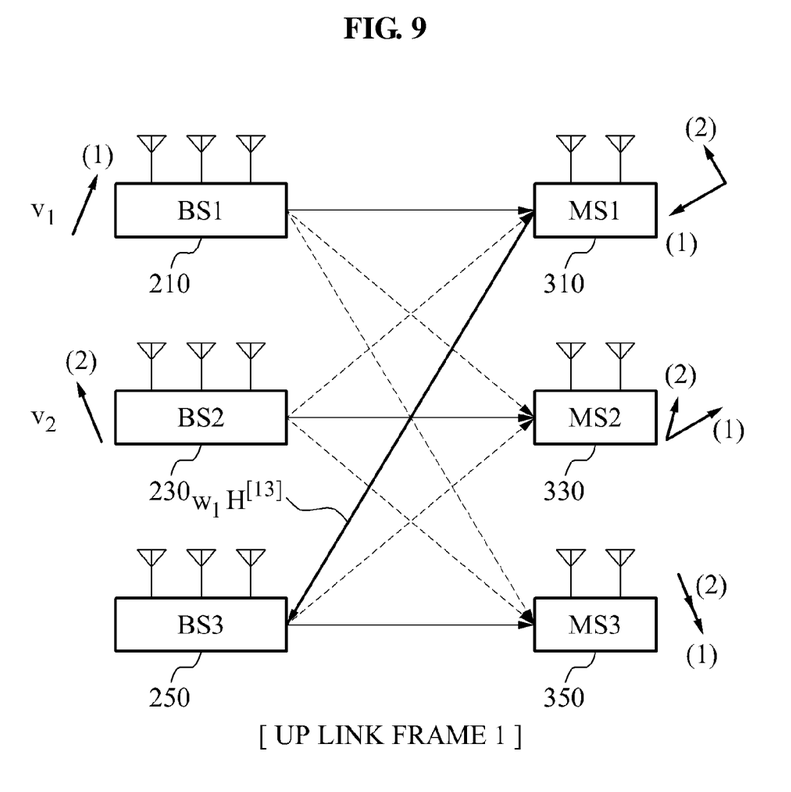

At operation S575, the receiving node R(1) 310 may generate precoding information based on the generated decoding vector $w_1$, and feed back the precoding information. That is, the receiving node R(1) 310 may generate precoding information $w_1H[13]$ in the same manner as operation S540, and feed back the generated precoding information $w_1H[13]$ to the source node T(3) 250, as illustrated in FIG. 9.

At operation S580, the source node T(3) 250 may generate a precoding vector $v_3$ based on the received precoding information $w_1H[13]$.

For example, the source node T(3) 250 may generate the precoding vector $v_3$ to enable the precoding vector $v_3$ to be orthogonal to the received precoding information $w_1H[13]$, received from the receiving node R(1) 310, and orthogonal to the precoding information $w_2H[23]$ received from the receiving node R(2) 330 at operation S540.

Figure 10:
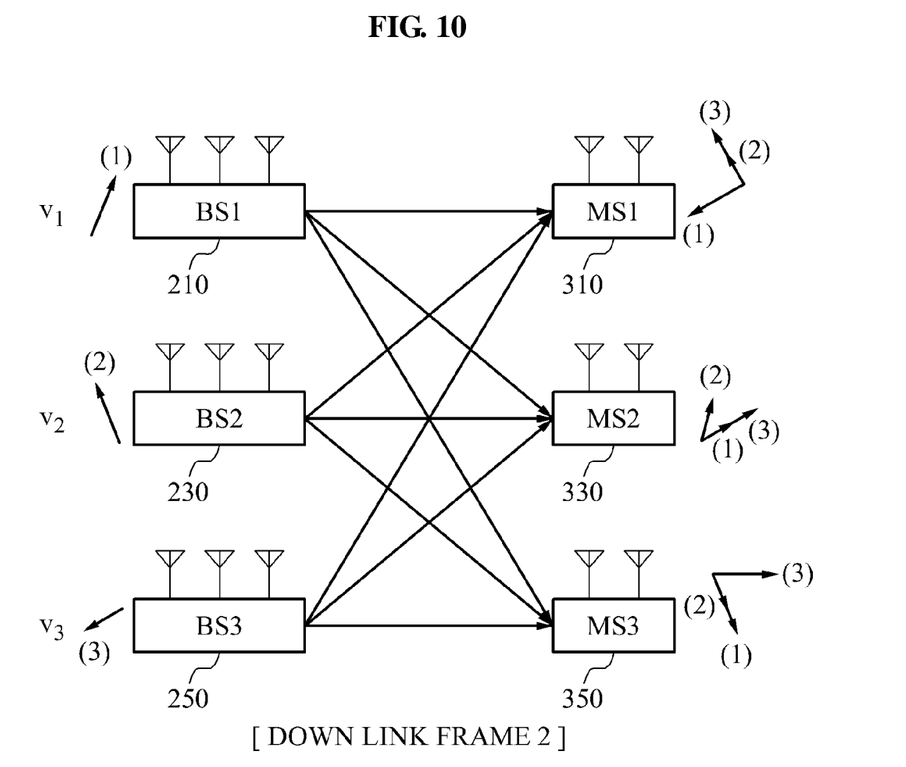

At operation S590, each of the source nodes 210, 230, and 250 may perform beamforming with respect to data to be transmitted, using each of the precoding vectors $v_1$, $v_2$, and $v_3$, and transmit the beamformed data. Accordingly, as illustrated in FIG. 10, an interference alignment with respect to an interference signal, generated due to the source node T(3) 250 and the source node T(2) 230, may be performed in the receiving node R(1) 310. Also, an interference alignment with respect to an interference signal, generated due to the source node T(1) 210 and the source node T(3) 250, may be performed in the receiving node R(2) 330.

Accordingly, a number of repetitions that the source nodes 210, 230, and 250 transmit the reference signals and generate the precoding vectors and the receiving nodes 310, 330, and 350 transmit the precoding information may be reduced to "K–1." Therefore, K may denote a number of pairs of source nodes and receiving nodes.

Although it has been described above that the receiving node 310 feeds back the precoding information to any one of the source nodes 210, 230, and 250, the receiving node is not limited to the above example. The receiving node 310 may transmit a precoding index to any one of the source nodes 210, 230, and 250 to enable a source node to extract a precoding vector through a codebook. For example, the precoding index may be a Precoding Matrix Index (PMI), and the codebook may include a precoding index and a precoding vector corresponding to the precoding index.

Accordingly, a decoding vector, generated by the decoding vector generation unit 317, may be orthogonal or non-orthogonal to an interference signal, and simply maintain orthogonality within a predetermined orthogonal range. That is, a multiplication of the decoding vector and the interference signal may be an approximate value of "0." Therefore, the approximate value may indicate the predetermined orthogonal range, and the interference signal may indicate a signal received from source nodes excluding a source node corresponding to a receiving node to generate the decoding vector.

Also, although it has been described above that a source node generates a precoding vector using precoding information, received from the receiving nodes 310, 330, and 350, the source node is not limited to the above example. Each of the source nodes 210, 230, and 250 may receive a precoding index instead of precoding information from the receiving nodes 310, 330, and 350, and generate a precoding vector using a previously stored codebook and the precoding index. For example, the codebook may include a precoding index and a precoding vector corresponding to the precoding index.

Accordingly, the precoding vector, generated by the precoding vector generation unit 215, may be orthogonal or non-orthogonal to the precoding information, and simply maintain orthogonality within a predetermined precoding range. That is, a multiplication of the precoding vector and the precoding information may be an approximate value of "0." Therefore, the approximate value may indicate the predetermined precoding range.

Also, although it has been described above that the receiving unit 213 of a source node receives an interference alignment structure order from a central control unit, which is not illustrated, the interference alignment structure order is not limited to the above example. The interference alignment structure order may be shared by each of the source nodes 210, to 230, and 250, for example.

Additionally, although it has been described above that the interference alignment structure order is predetermined to be in an order from the source node T(1) 210, the source node T(2) 230, and the source node T(3) 250, the interference alignment structure order may vary. That is, an order of the source nodes 210, 230, and 250 that transmit a reference signal for interference alignment and calculate a precoding vector may vary.

Furthermore, although it has been described above that a number of pairs of source nodes and receiving nodes is "3," the number of pairs may be other than "3," for example, greater than three.

In addition, in FIGS. 2 and 3, although the interference alignment structure order used in the source node 210 is defined as an order of sequentially generating precoding vectors, and the interference alignment structure order used in the receiving node 310 is defined as an order of sequentially generating reference signals, an interference alignment structure order used in a source node and a receiving node may be identical.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media may include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a mobile station described herein may refer to mobile devices such as a cellular phone, a personal digital assistant (PDA), a digital camera, a portable game console, and an MP3 player, a portable/personal multimedia player (PMP), a handheld e-book, a portable lab-top PC, and a global positioning system (GPS) navigation.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device of a plurality of communication devices performing interference alignment, the communication device comprising:
 a receiving unit configured to receive a predetermined interference alignment structure order that indicates a sequential order in which each of the plurality of communication devices transmits a reference signal, and to receive precoding information from one of a plurality of mobile stations (MSs) included in a user group corresponding to the communication device;
 a transmission unit configured to transmit a specific reference signal based upon the sequential order indicated in the received interference alignment structure order; and
 a generation unit configured to generate a precoding vector based on the precoding information, wherein:
 the precoding information is generated in response to the transmission of the specific reference signal,
 the precoding information indicates a vector obtained by multiplying a decoding vector with channel information, and
 the channel information corresponds to a channel between the communication device and the one MS.

2. The communication device of claim 1, wherein the received interference alignment structure order indicates a sequential order in which each of the plurality of communication devices generates the precoding vector to perform interference alignment.

3. The communication device of claim 1, wherein:
 the transmission unit is configured to transmit the specific reference signal to any one of a plurality of mobile stations (MSs) included in the user group corresponding to the communication device, and
 wherein the received interference alignment structure order indicates an order of repetition in which each of the plurality of communication devices transmits the specific reference signal, receives the precoding information, and generates the precoding vector.

4. The communication device of claim 1, wherein the specific reference signal is a signal transmitted through a single antenna, or a beamformed signal transmitted through a plurality of antennas.

5. The communication device of claim 1, wherein:
 the precoding vector is orthogonal to the received precoding information; and
 the transmission unit is further configured to transmit data which is beamformed using the generated precoding vector.

6. The communication device of claim 1, wherein:
the precoding information indicates a precoding index,
the generation unit is further configured to generate the precoding vector using the precoding index and a previously stored codebook; and
the codebook comprises the precoding index and the precoding vector corresponding to the precoding index.

7. An interference alignment method in any one of a plurality of communication devices performing interference alignment, the interference alignment method comprising:
receiving a predetermined interference alignment structure order that indicates a sequential order in which each of the plurality of communication devices transmits a reference signal;
transmitting a specific reference signal based upon the sequential order indicated in the received interference alignment structure order;
receiving precoding information generated in response to the transmission of the specific reference signal; and
generating a precoding vector based on the precoding information, wherein:
the precoding information is received from one of a plurality of mobile stations (MSs) included in a user group corresponding to the one communication device,
the precoding information indicates a vector obtained by multiplying a decoding vector with channel information, and
the channel information corresponds to a channel between the one communication device and the one MS.

8. The interference alignment method of claim 7, wherein the received interference alignment structure order indicates an order in which each of the plurality of communication devices sequentially generates the precoding vector to perform interference alignment.

9. A mobile station, comprising:
a receiving unit configured to receive, through a wireless communication channel, a reference signal based on a predetermined interference alignment structure order;
a generation unit configured to:
generate a decoding vector based on the received reference signal; and
generate precoding information based on the generated decoding vector; and
a feedback unit configured to feed back the generated precoding information, wherein
the interference alignment structure order indicates a sequential order in which each of a plurality of communication devices transmits a reference signal.

10. The mobile station of claim 9, wherein the interference alignment structure order indicates the order in which each of the plurality of communication devices sequentially transmits the reference signal to perform interference alignment.

11. The mobile station of claim 10, further comprising:
a channel estimation unit configured to estimate channel information corresponding to each of a plurality of communication devices based on received reference signals so as to perform channel estimation,
wherein the receiving unit is further configured to receive the reference signal from each of the plurality of communication devices.

12. The mobile station of claim 11, wherein the precoding information comprises at least one of the channel information and the generated decoding vector.

13. A communication method, comprising:
receiving, through a wireless communication channel, a reference signal based on a predetermined interference alignment structure order;
generating a decoding vector based on the received reference signal;
generating precoding information based on the generated decoding vector; and
feeding back, through the wireless communication channel, the generated precoding information, wherein
the interference alignment structure order indicates a sequential order in which each of the plurality of communication devices transmits a reference signal.

14. The communication method of claim 13, wherein the interference alignment structure order indicates the order in which each of the plurality of communication devices sequentially transmits the reference signal to perform interference alignment.

15. The communication method of claim 14, further comprising:
estimating channel information of each of a plurality of communication devices based on received reference signals to perform channel estimation, and
performing channel estimation based on the reference signal received from each of the plurality of communication devices.

16. The communication method of claim 15, wherein the precoding information comprises at least one of the channel information and the generated decoding vector.

* * * * *